US012618765B2

(12) United States Patent
Lam et al.

(10) Patent No.: US 12,618,765 B2
(45) Date of Patent: May 5, 2026

(54) CYTOMETER AND A METHOD OF CYTOMETRY

(71) Applicant: CITY UNIVERSITY OF HONG KONG, Kowloon (HK)

(72) Inventors: Hiu-wai Raymond Lam, Kowloon (HK); Wei Huang, Kowloon (HK)

(73) Assignee: CITY UNIVERSITY OF HONG KONG, Kowloon (HK)

( * ) Notice: Subject to any disclaimer, the term of this patent is extended or adjusted under 35 U.S.C. 154(b) by 397 days.

(21) Appl. No.: 18/161,005

(22) Filed: Jan. 27, 2023

(65) Prior Publication Data

US 2023/0243732 A1 Aug. 3, 2023

Related U.S. Application Data

(60) Provisional application No. 63/304,477, filed on Jan. 28, 2022.

(51) Int. Cl.
*G01N 15/1429* (2024.01)
*G01N 15/10* (2006.01)

(52) U.S. Cl.
CPC . *G01N 15/1429* (2013.01); *G01N 2015/1006* (2013.01)

(58) Field of Classification Search
CPC ................................................. G01N 15/1429
See application file for complete search history.

(56) References Cited

U.S. PATENT DOCUMENTS

2022/0050042 A1* 2/2022 Morgan ............. G01N 15/1023
2022/0152611 A1* 5/2022 Hassan ............. B01L 3/502715
2024/0361227 A1* 10/2024 Subramaniam .... G01N 15/1031
2025/0012704 A1* 1/2025 Javanmard ......... G01N 15/0656

* cited by examiner

*Primary Examiner* — Ricky Go

(74) *Attorney, Agent, or Firm* — Conley Rose, P.C.; Michael W. Piper; Gayatry Nair

(57) ABSTRACT

A cytometer includes a plurality of measurement sections, each comprising first and second sidewalls and a base therebetween, the sidewalls and base defining a channel portion extending from an entrance to an exit; an electrode group arranged on the opposite sides of the base and part way between the entrance and exit, the electrode group comprising an upstream electrode, a centre electrode and a downstream electrode in the way of a trajectory between the entrance and exit, and in respective order; the measurement sections being connected together to form at least one measurement channel comprising a plurality of the channel portions connected together in series; and, a lock-in amplifier; the central electrode of each group connected to the excitation signal port of the lock-in amplifier, and the upstream and downstream electrodes connected to the voltage differential input ports of the lock-in amplifier.

14 Claims, 9 Drawing Sheets

1

CYTOMETER AND A METHOD OF CYTOMETRY

CROSS-REFERENCE TO RELATED APPLICATIONS

The present application claims priority to U.S. Provisional Application No. 63/304,477 filed with the United States Patent and Trademark Office on Jan. 28, 2022 and entitled "HIGH-THROUGHPUT ELECTRICAL CELL CYTOMETRY FOR WHOLE-CELL BIOPHYSICAL PROPERTIES," which is incorporated herein by reference in its entirety for all purposes.

TECHNICAL FIELD OF THE INVENTION

The present invention relates to a cytometer. More particularly, but not exclusively, the present invention relates to a cytometer comprising a plurality of measurement sections, each measurement section comprising a channel portion defined by a base and sidewalls and an electrode group arranged on the opposite side of the base to the channel portion, the measurement sections being connected together to form at least one measurement channel comprising a plurality of channel portions connected in series, the cytometer further comprising at least one lock-in amplifier, the electrode groups being connected to the at least one lock-in amplifier. The present invention also relates to a method of cytometry. More particularly, but not exclusively, the present invention relates to a method of cytometry comprising the steps of providing a cytometer according to the invention and determining the undeformed diameter and surface charge of cells passing along the channel portions from the output of the at least one lock-in amplifier.

BACKGROUND

Cell physical properties including size, shape, elastic modulus, cytoplasmic viscosity and electric permittivity, are determined by the intracellular structures and molecular compositions. Cell physical properties can be label free and non-invasive biomarkers, as they vary upon some disease and the underlying pathological molecular alterations in the involved cells. For example, cell elastic modulus is well known to be related to malignancy and invasiveness of tumor cells and the immunological state of immune cells. It has also been demonstrated that electric permittivity of cells reflects intercellular communication, cell adhesion and nutrient absorption. Mechanical and electrical properties exhibit cell phenotypes in different aspects, eg cell stiffness for cell motility and alpha dispersion for charges membrane molecules. Multiparametric phenotyping of individual cells for both mechanical and electrical properties can achieve a more promising prognostic/diagnostic strategy. Ideally these properties should not correlate among others, and each reflect a unique physical aspect.

Physical cell phenotyping techniques are known, yet the concerned cell properties are 'monotonic' ie either mechanical or electrical. This limits the phenotyping depth and the applicability in disease prognosis/diagnosis and cell classification. Known techniques of mechanical cell phenotyping include deformability cytometry which is based on microscopic imaging of cell deformation upon flow stresses in microchannels. Known techniques of electrical cell phenotyping include impedance cytometry.

The present invention seeks to overcome the problems of the prior art.

SUMMARY OF INVENTION

Accordingly, in a first aspect the present invention provides a cytometer comprising a plurality of measurement sections, each measurement section comprising first and second sidewalls and a base extending therebetween, the first and second sidewalls and base defining a channel portion therebetween, the sidewalls and base extending from an entrance to an exit;

an electrode group arranged on the opposite side of the base to the channel portion and part way between the entrance and exit, the electrode group comprising an upstream electrode, a downstream electrode and a center electrode, the electrodes being arranged such that as one travels from the entrance to the exit one passes over the upstream electrode, then the center electrode and then the downstream electrode;

the channel portion having a width measured in a direction normal to the sidewalls; the measurement sections being connected together to form at least one measurement channel comprising a plurality of the channel portions connected together in series, with each channel portion of the measurement channel having a different width; and, at least one lock-in amplifier;

the electrode groups being configured such that for each group the central electrode is connected to the excitation signal port of a lock-in amplifier and the upstream and downstream electrodes are connected to the voltage differential input ports of the lock-in amplifier.

The cytometer according to the invention enables measurement of undeformed cell diameter, cell surface charge and cell stiffness from the output of the at least one lock-in amplifier.

Preferably the at least one measurement channel comprises first and second channel portions only.

Alternatively, the at least one measurement channel comprises at least three channel portions.

Preferably the measurement sections are connected together to form a plurality of measurement channels, each measurement channel comprising a plurality of channel portions.

Preferably for at least two measurement channels the electrode groups of one measurement channel are connected to the corresponding electrode groups of the other measurement channel.

Preferably the cytometer further comprises a signal processor configured to receive the output from the at least one lock-in amplifier and perform the steps of (a) identify the set of ripples in the output which are produced by the passage of a cell along different channel portions of a single measurement channel;

(b) for at least two ripples $\alpha$, $\beta$ of the set of ripples which correspond to passage of the cell along channel portions $c\alpha$ and $c\beta$ determine the peak-to-peak amplitudes $$V_{pp}^{\alpha}$$

and $$V_{pp}^{\beta}$$

of the ripples; and, (c) solve the simultaneous equations $$V_{pp}^{\alpha} = k\left(D_{deform}^2(D_{Cell}, W_{c\alpha}) + b\right)$$

$$V_{pp}^{\beta} = k\left(D_{deform}^2(D_{Cell}, W_{c\beta}) + b\right)$$

to determine the cell surface charge k and the unde-formed diameter of the cell $D_{cell}$ where b is a constant, $W_{c\alpha}$ and $W_{c\beta}$ are the widths of the channel portions $\alpha$ and $\beta$ and $D_{deform}(D_{cell}, W)$ is the diameter of a deformed cell of undeformed diameter $D_{cell}$ in a channel of width W and is related to $D_{cell}$ and W by the relation $$\frac{4}{3}\pi\left(\frac{D_{cell}}{2}\right)^3 = 2\pi\left(\frac{D_{deform}}{2}\right)^2\left(\frac{W}{2}\right) - \frac{2\pi}{3}\left(\frac{W}{2}\right)^3$$

Preferably the signal processor is further configured to perform the steps of (d) selecting a ripple r from the set of ripples and for the ripple r divide a predetermined constant C by the peak-to-peak time $t_{pp}$ of the ripple r to determine the speed of the cell which caused the ripple;

(e) determining the driving force $F_d$ on the cell in channel portion $C_r$ from a model for channel portion $C_r$ of driving force as a function of cell speed and $D_{cell}$; and (f) determine the cell stiffness E from $D_{cell}$, $W_{cr}$ and $F_d$ Preferably the cell stiffness E is determined from the equation $$E = \left[\frac{6}{D_a} + \right.$$

$$\left. \frac{3\theta D_a}{D_{deform}^2} - \frac{8}{\pi}\frac{(3 + v - 2v^2)D_{Cell}^2 + 2(1 - v^2)D_a^2}{(1 - v^2)(D_a^2 + 4D_{cell}^2)^{3/2}}\left(1 + \frac{\theta D_a^2}{5D_{deform}^2}\right)\right]\frac{\psi(1 - v^2)F_n}{2(D_{Cell} - W_{cr})}$$

where $$D_a = \sqrt{D_{cell}^2 - W^2} + D_{deform} - D_{Cell}$$

$$\psi = \frac{(1 - \zeta)^2}{(1 - \zeta + \zeta^2/3)}$$

$$\theta = \frac{1 - \zeta/3}{1 - \zeta + \zeta^2/3}$$

$$\zeta = 1 - \frac{W_{cr}}{D_{Cell}}$$

and $$F_n = \frac{F_d}{2\mu}$$

where $\mu$ is the coefficient of friction of the sidewall and $v$ is the Poisson ratio which is set equal to 0.5.

Preferably the signal processor is further configured to compare each of the set of identified ripples to an expected ripple shape and to select the at least two ripples $\alpha$, $\beta$ which most closely resemble the expected ripple shape.

Preferably each channel portion is straight and of uniform width.

Preferably the cytometer further comprises a fluid source configured to provide a pressurised fluid to the channel portion of the first measurement section of each measurement channel.

In a further aspect of the invention there is provided a method of cytometry comprising the steps of (a) providing a cytometer as claimed in claim 1;

(b) identifying the set of ripples in the output which are produced by the passage of a cell along different channel portions of a single measurement channel;

(c) for at least two ripples $\alpha$, $\beta$ of the set of ripples which correspond to passage of the cell along channel portions $c\alpha$ and $c\beta$ determining the peak-to-peak amplitudes $$V_{pp}^{\alpha}$$

and $$V_{pp}^{\beta}$$

of the ripples; and, (d) solving the simultaneous equations $$V_{pp}^{\alpha} = k\left(D_{deform}^2(D_{Cell}, W_{c\alpha}) + b\right)$$

$$V_{pp}^{\beta} = k\left(D_{deform}^2(D_{Cell}, W_{c\beta}) + b\right)$$

to determine the cell surface charge k and the unde-formed diameter of the cell $D_{cell}$ where b is a constant, $W_{c\alpha}$ and $W_{c\beta}$ are the widths of the channel portions $c\alpha$ and $c\beta$ and $D_{deform}(D_{cell}, W)$ is the diameter of a deformed cell of undeformed diameter $D_{cell}$ in a channel of width W and is related to $D_{cell}$ and W by the relation $$\frac{4}{3}\pi\left(\frac{D_{cell}}{2}\right)^3 = 2\pi\left(\frac{D_{deform}}{2}\right)^2\left(\frac{W}{2}\right) - \frac{2\pi}{3}\left(\frac{W}{2}\right)^3$$

Preferably the method further comprises the steps of (e) selecting a ripple r from the set of ripples and for ripple r divide a predetermined constant C by the peak-to-peak time $t_{pp}$ of the ripple r to determine the speed of the cell which caused the ripple;

(f) determining the driving force $F_d$ on the cell in the channel portion cr from a model for channel portion cr of driving force as a function of cell speed and $D_{Cell}$; and (g) determining the cell stiffness E from $D_{cell}$, $W_{cr}$ and $F_d$ Preferably the cell stiffness E is determined from the equation $$E = \left[\frac{6}{D_a} + \right.$$

$$\left. \frac{3\theta D_a}{D_{deform}^2} - \frac{8}{\pi}\frac{(3 + v - 2v^2)D_{Cell}^2 + 2(1 - v^2)D_a^2}{(1 - v^2)(D_a^2 + 4D_{cell}^2)^{3/2}}\left(1 + \frac{\theta D_a^2}{5D_{deform}^2}\right)\right]\frac{\psi(1 - v^2)F_n}{2(D_{Cell} - W_{cr})}$$

where $$D_a = \sqrt{D_{cell}^2 - W^2} + D_{deform} - D_{Cell}$$

$$\psi = \frac{(1 - \zeta)^2}{(1 - \zeta + \zeta^2/3)}$$

-continued $$\theta = \frac{1 - \zeta/3}{1 - \zeta + \zeta^2/3}$$

$$\zeta = 1 - \frac{W_{cr}}{D_{Cell}}$$

and $$F_n = \frac{F_d}{2\mu}$$

where $\mu$ is the coefficient of friction of the sidewall and $v$ is the Poisson ratio which is set equal to 0.5.

DRAWINGS

The present invention will now be described by way of example only and not in any limitative sense with reference to the accompanying drawings in which FIG. 1 shows, in perspective view, a cell travelling along a channel portion;

DESCRIPTION OF EMBODIMENTS

Figure 1:
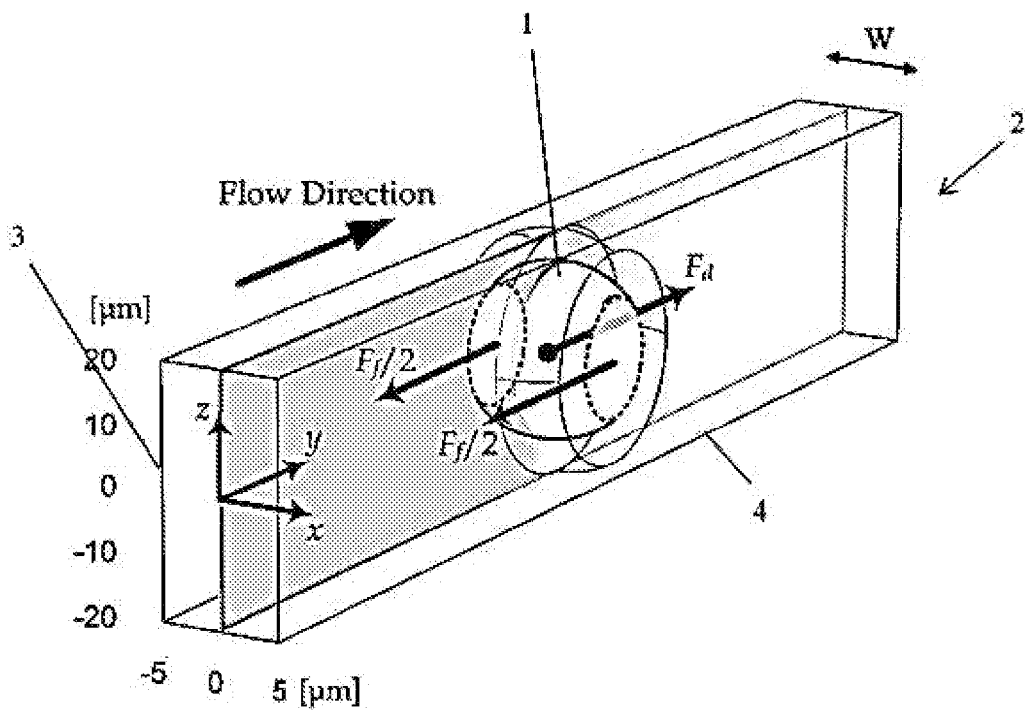

By way of background, FIG. 1 shows, in perspective view, a cell travelling along a channel portion. The channel portion comprises first and second sidewalls and a base extending therebetween. The channel portion has a width W in a direction normal to the first and second sidewalls.

Figure 2:
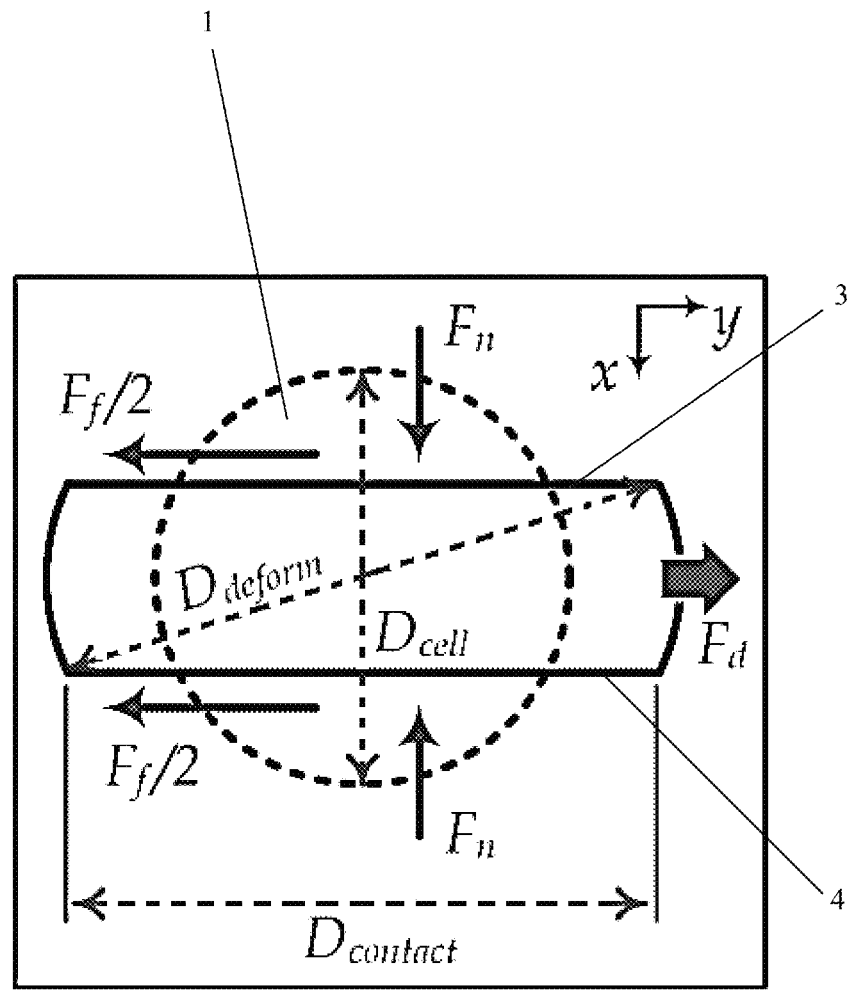
FIG. 2 shows the relation between $D_{cell}$ and $D_{deform}$ for a cell.

Arranged within the channel portion is a cell. The cell has an undeformed dimeter $D_{cell}$ which is larger than the width of the channel portion. Accordingly, the first and second sidewalls of the channel portion deform the cell into the shape of a cut sphere of diameter $D_{Deform}$ as shown in FIG. 2. The relationship between $D_{cell}$ and $D_{Deform}$ is given by $$\frac{4}{3}\pi\left(\frac{D_{cell}}{2}\right)^3 = 2\pi\left(\frac{D_{deform}}{2}\right)^2\left(\frac{W}{2}\right) - \frac{2\pi}{3}\left(\frac{W}{2}\right)^3$$

A fluid under pressure is provided to one end of the channel portion to drive the cell along the channel portion. Assuming the velocity of the cell is substantially constant then, from FIG. 2, $$F_d = 2\mu F_n$$

where $F_d$ is the driving force on the cell from the fluid, $\mu$ is the coefficient of friction of each of the sidewalls and $F_n$ is the normal force from the sidewall on the cell.

Figure 3:
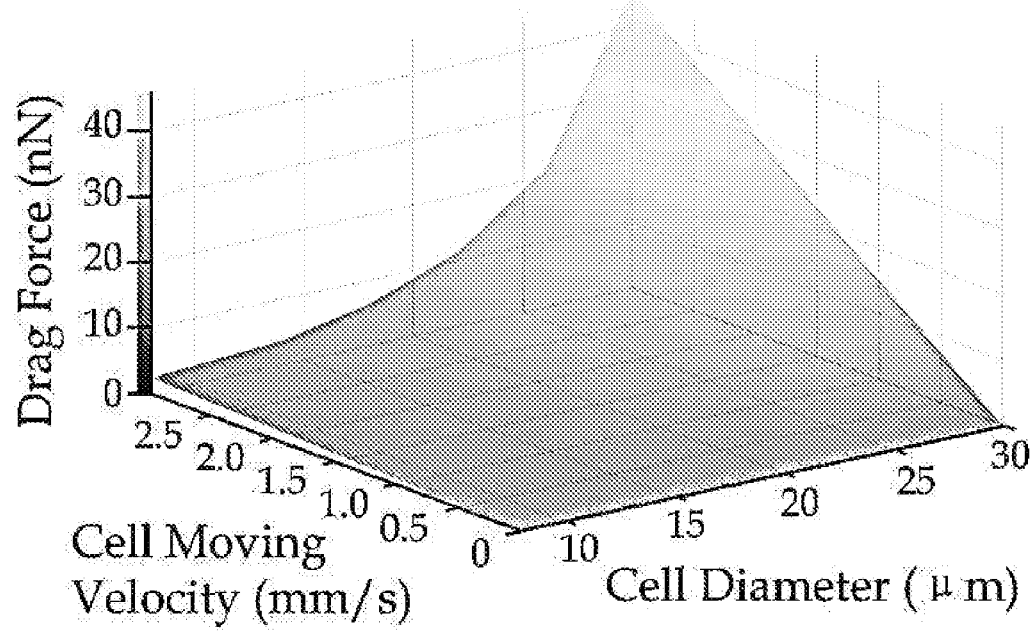
FIG. 3 shows the relationship between cell speed, undeformed cell diameter and driving force.

For constant fluid pressure and width W of the channel portion one can numerically model the driving force $F_d$ on the cell as a function of cell moving velocity (speed) and cell diameter $D_{cell}$. The result of such modelling is shown in FIG. 3.

Figure 4:
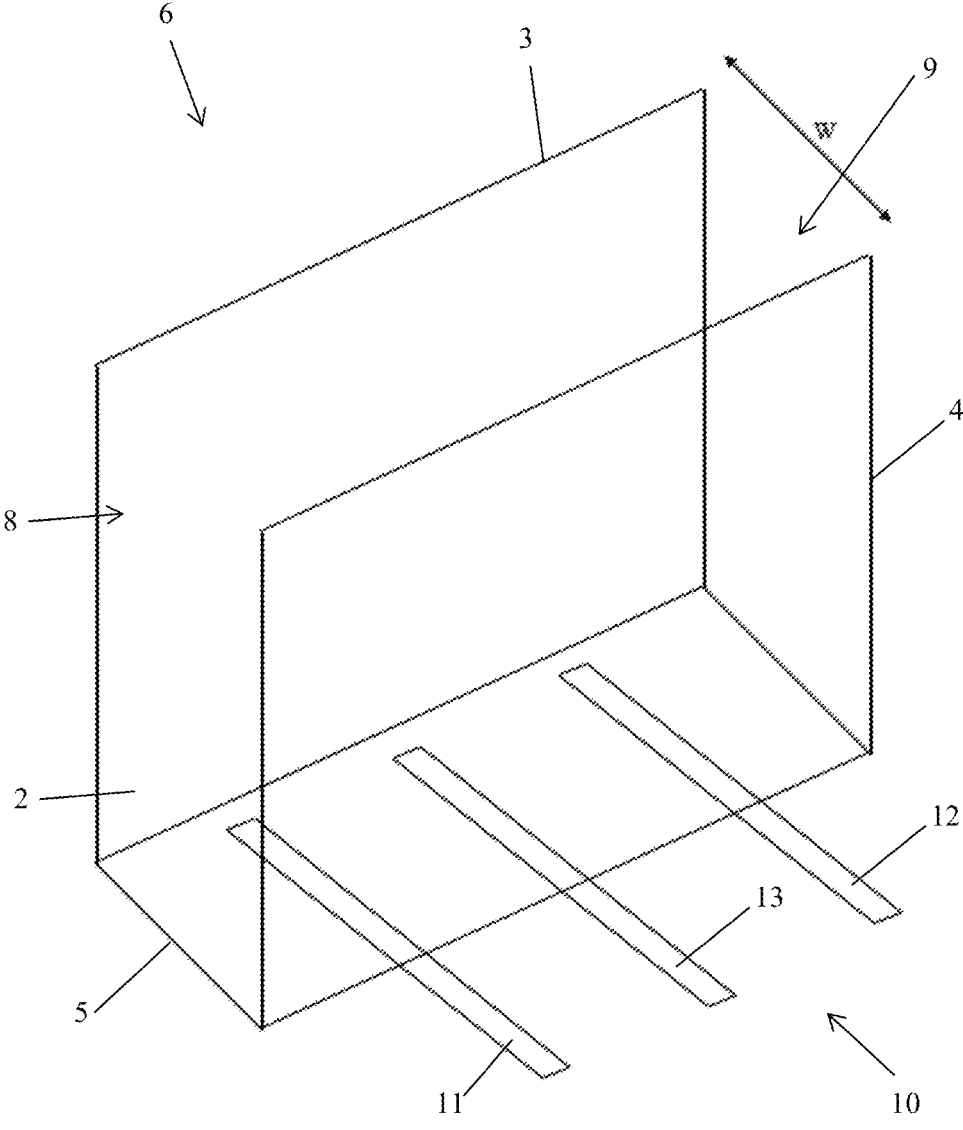
FIG. 4 shows, in perspective view, a measurement section of a cytometer according to the invention.

Turning now to the invention, FIG. 4 shows, in perspective view, a measurement section of a cytometer according to the invention. The measurement section comprises first and second sidewalls and a base extending therebetween. The sidewalls and base together define a channel portion which extends from an entrance to an exit. The channel portion is straight and of constant width W. Width is measured in a direction normal to the sidewalls.

Arranged on the opposite side of the base to the channel portion part way between the entrance and exit is an electrode group. The electrode group comprises an upstream electrode, a downstream electrode and a center electrode. The electrodes are arranged such that as a cell passes along the channel portion from the entrance to the exit it passes over the upstream electrode, then over the central electrode and finally over the downstream electrode.

Figure 5:
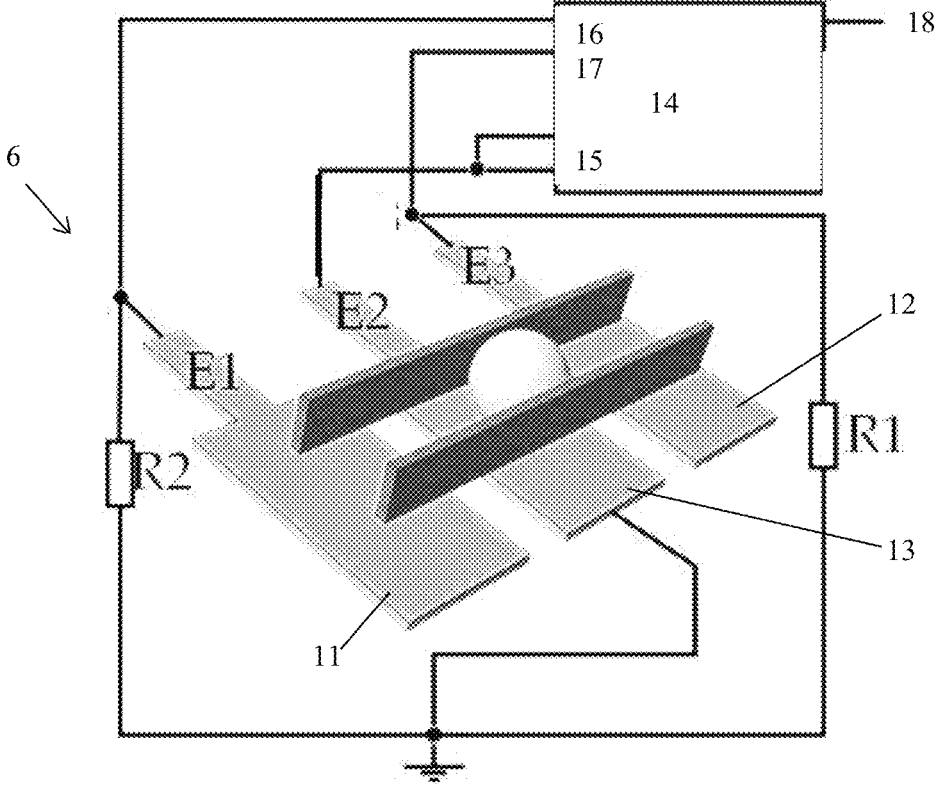
FIG. 5 shows, in schematic form, the measurement section of a cytometer according to the invention with the electrodes connected to a lock-in amplifier.
Figure 6:
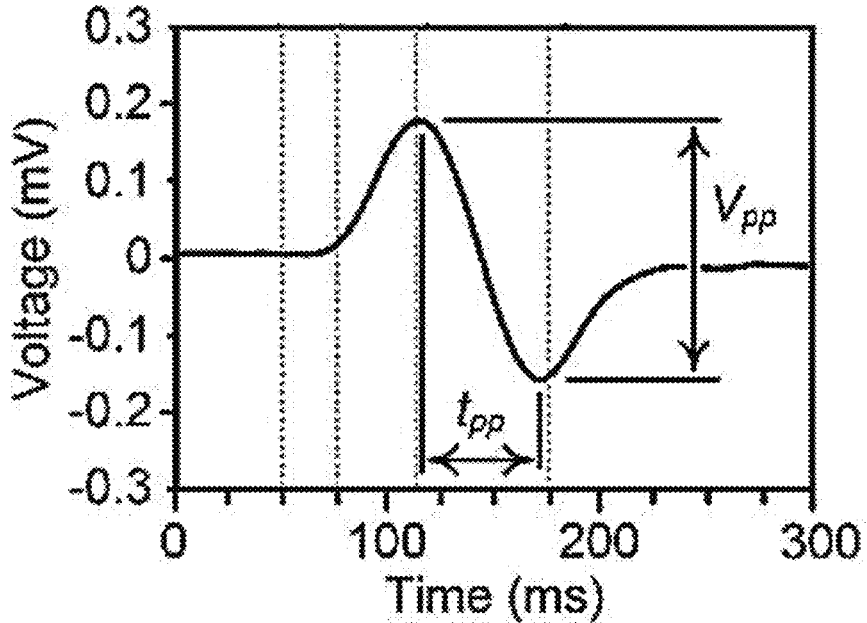
FIG. 6 shows a ripple in the output of the lock-in amplifier.

FIG. 5 shows, in schematic form a measurement section of a cytometer according to the invention with the electrodes of the electrode group connected to a lock-in amplifier. The operation of lock-in amplifiers is well known and so will not be described in detail. The lock-in amplifier comprises an excitation port, voltage differential ports and an output port. The excitation port is connected to the center electrode. The voltage differential ports are connected to the upstream and downstream electrodes respectively. In use an AC excitation signal is provided to the center electrode. As a cell passes along the channel portion it affects the charge on the electrodes. This produces a ripple in the output of the lock-in amplifier as shown in FIG. 6.

One important parameter of the ripple is the peak-to-peak voltage $V_{pp}$. It is found that this can be related to the cell surface charge K, the undeformed diameter of the cell $D_{cell}$ and the width W of the channel portion by the equation $$V_{pp} = K\left(D_{deform}^2(D_{Cell}, W) + b\right)$$

Where b is a constant which can be determined experimentally.

A further important parament of the ripple is the peak-to-peak time $t_{pp}$. The speed of the cell along the channel portion can be determined by dividing a constant C by this peak-to-peak time. C is experimentally determined but is related to the distance between the electrodes in the electrode group.

Figure 7:
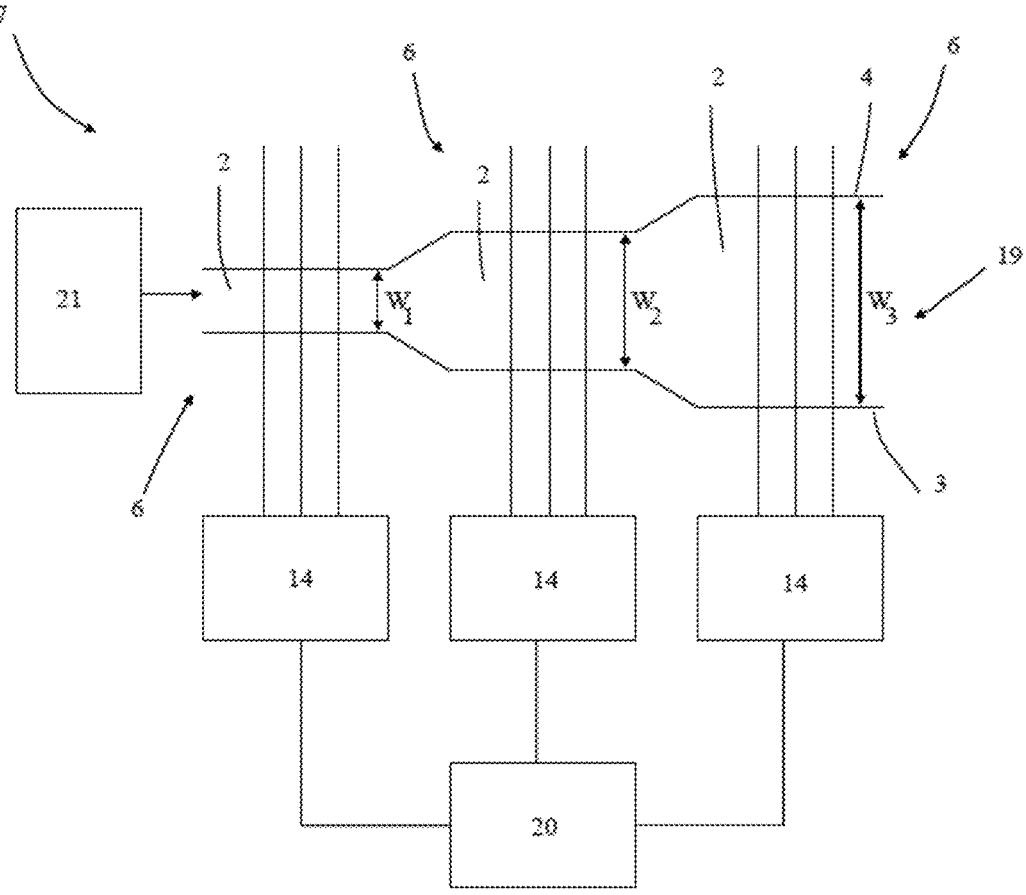
FIG. 7 shows a first embodiment of a cytometer according to the invention in plan view.

Shown in FIG. 7 is plan view is a first embodiment of a cytometer according to the invention. The cytometer comprises a plurality of measurement sections as previously described. The measurement sections are connected together to form a measurement channel which comprises a plurality of the channel portions connected together in series with each channel portion having a different width. The cytometer further comprises a plurality of lock-in amplifiers with each electrode group being connected to a different lock-in amplifier as shown. A processor is connected to the output ports of the lock-in amplifiers. The cytometer further comprises a fluid source for providing a pressurised fluid (typically a liquid) to the first channel portion of the measurement channel.

In use a cell is provided to the first channel portion and is driven along from one channel portion to the next by the fluid pressure until it exits the last channel portion. As the cell travels over an electrode group the lock-in amplifier connected to that group produces a ripple in its output which is received by the processor.

The processor processes the received outputs from the lock-in amplifiers. In a first step the processor identifies the set of ripples in the outputs which are produced by the passage of a cell along different channel portions of the single measurement channel. If only one cell is provided, then this is all of the ripples as there is only one measurement channel. If multiple cells are provided, one after the other, then the ripples are divided into different sets with the ripples in one set corresponding to the passage of one cell from one end of the measurement channel to the other. The method can be repeated for each set.

In the next step the processor selects two ripples $\alpha,\beta$ of the set of ripples which correspond to passage of the cell along channel portions $c\alpha$ and $c\beta$. For these two ripples $\alpha,\beta$ the processor determines their peak to peak amplitudes $$V_{pp}^{\alpha}$$

and $$v_{pp}^{\beta}.$$

In the next step the processor then solves the simultaneous equations $$V_{pp}^{\alpha} = k\left(D_{deform}^2(D_{Cell},\ W_{c\alpha}) + b\right)$$

$$V_{pp}^{\beta} = k\left(D_{deform}^2(D_{Cell},\ W_{c\beta}) + b\right)$$

So as to determine the cell surface charge k and the undeformed diameter of the cell $D_{cell}$ b is an experimentally determined constant. $W_{c\alpha}$ and $W_{c\beta}$ are the widths of the channel portions $c\alpha$ and $c\beta$ and $D_{deform}(D_{cell}, W)$ is the diameter of a deformed cell of undeformed diameter $D_{cell}$ in a channel of width W and is related to $D_{cell}$ and W by the relation $$\frac{4}{3}\pi\left(\frac{D_{cell}}{2}\right)^3 = 2\pi\left(\frac{D_{deform}}{2}\right)^2\left(\frac{W}{2}\right) - \frac{2\pi}{3}\left(\frac{W}{2}\right)^3$$

The processor may repeat this step for different pairs of ripples $\alpha,\beta$ to check for consistency.

One the processor has determined $D_{cell}$ it is then possible to determine the cell stiffness. In a next step the processor selects a ripple r from the set of ripples. This may or may not be one of the ripples $\alpha,\beta$. For this ripple the processor determines the peak-to-peak time and hence the speed of the cell along channel portion cr as described above. From the cell speed and $D_{cell}$ the processor then determines the driving force $F_d$ on the cell from a model for channel portion cr of driving force as a function of cell speed and $D_{cell}$ as described above with reference to FIG. 3.

Once the driving force has been determined in a final step the processor determines the cell stiffness E from the equation $$E = \left[\frac{6}{D_a} + \right.$$

$$\left. \frac{3\theta D_a}{D_{deform}^2} - \frac{8}{\pi}\frac{(3 + v - 2v^2)D_{Cell}^2 + 2(1 - v^2)D_a^2}{(1 - v^2)(D_a^2 + 4D_{cell}^2)^{3/2}}\left(1 + \frac{\theta D_a^2}{5D_{deform}^2}\right)\right]\frac{\psi(1 - v^2)F_n}{2(D_{Cell} - W)}$$

where $$D_a = \sqrt{D_{cell}^2 - W^2} + D_{deform} - D_{Cell}$$

$$\psi = \frac{(1 - \zeta)^2}{(1 - \zeta + \zeta^2/3)}$$

$$\theta = \frac{1 - \zeta/3}{1 - \zeta + \zeta^2/3}$$

$$\zeta = 1 - \frac{W}{D_{Cell}}$$

and $$F_n = \frac{F_d}{2\mu}$$

where $\mu$ is the coefficient of friction of the sidewall and $v$ is the Poisson ratio which is set equal to 0.5. Again, the processor may repeat this step with different ripple r is the set of ripples to check for consistency.

In the embodiment of FIG. 7 each electrode group is connected to a different lock-in amplifier.

Figure 8:
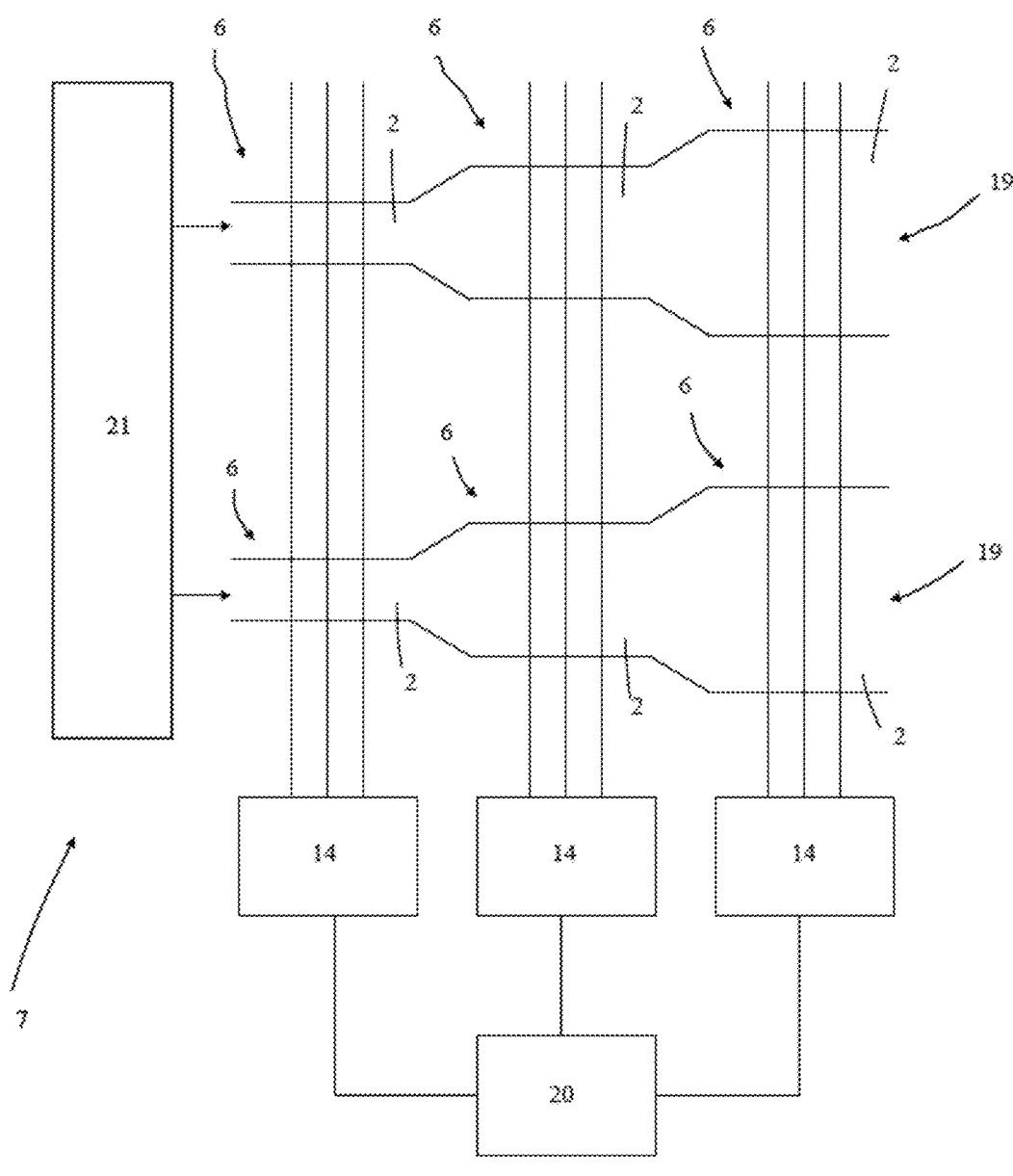
FIG. 8 shows a further embodiment of a cytometer according to the invention in plan view; and, FIG. 9 shows two cells simultaneously passing over two connected electrode groups and the output of the lock-in amplifier connected to the electrode groups.

Shown in FIG. 8 in plan view is a further embodiment of a cytometer according to the invention. This embodiment is similar to that of the embodiment of FIG. 7 except the measurement sections are connected together to form a plurality of measurement channels, each measurement channel comprising a plurality of channel portions of different widths. In this embodiment each electrode group of one channel is connected to the corresponding electrode group of the other channel as shown so reducing the number of lock-in amplifiers required. The operation of the cytometer of this embodiment is similar to that of the embodiment of FIG. 7 with the processor dividing the received ripples into sets where within each set the ripples correspond to one cell travelling along different channel portions of a single measurement channel. These ripples are then processed as described above to produce the cell data. Many sets of ripples can be processed in parallel corresponding to cells travelling in parallel down different measurement channels, so producing a high throughput.

Figure 9:
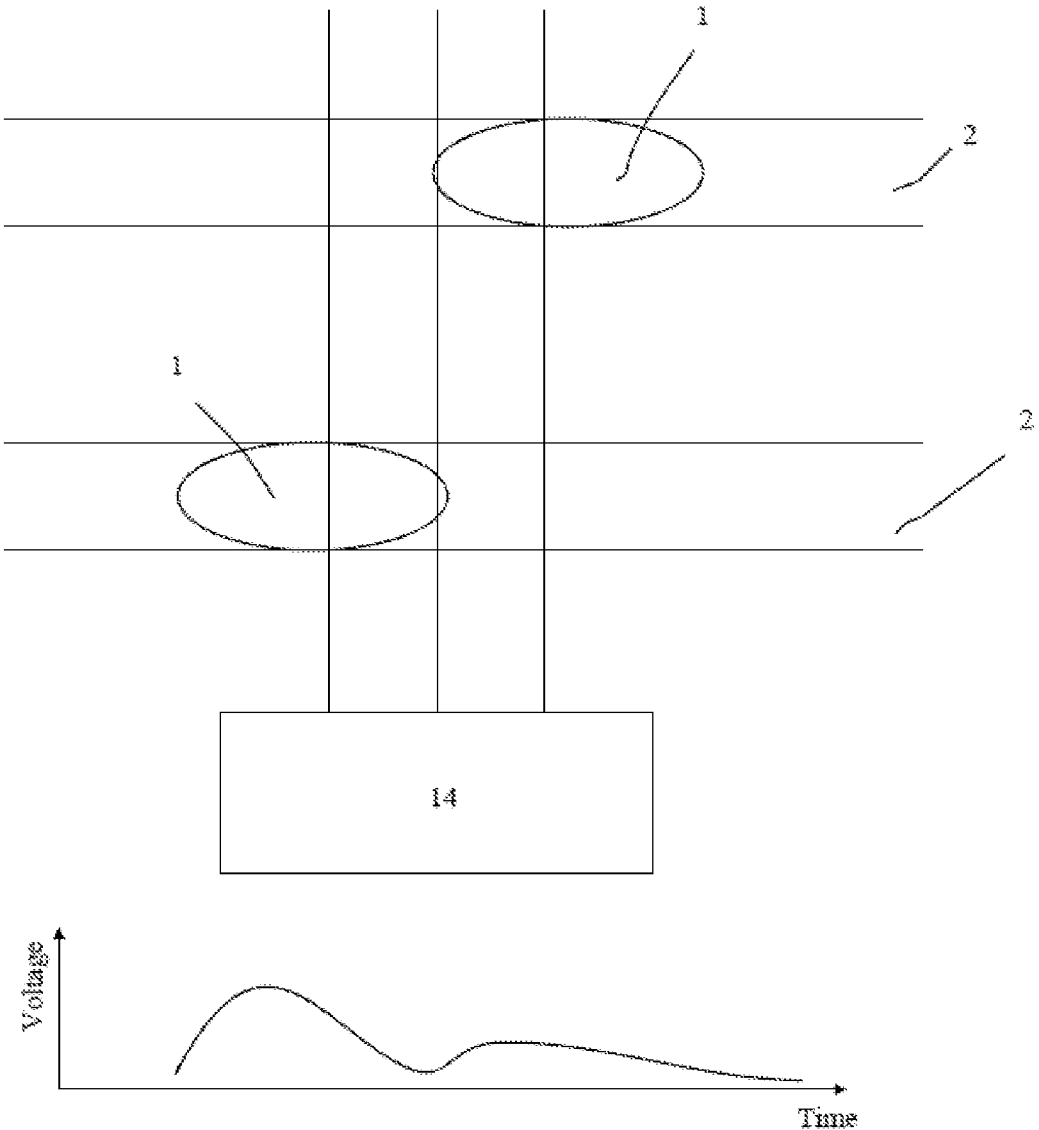

A problem associated with the embodiment of FIG. 8 is that a cell can pass over an electrode group of a measurement section of one measurement channel at substantially the same time as a cell passes over the connected electrode group of a measurement section of the other measurement channel. This results in the lock-in amplifier connected to these two electrode groups producing a ripple which is not of the expected shape as shown in FIG. 9. Fortunately, the two cells are unlikely to be of the same diameter and elastic modulus, and so will travel along the channel portions of their respective measurement channels at different speeds. They will therefore not pass over the other electrode groups simultaneously and so the remaining two lock-in amplifiers will produce ripples of the expected shape. In order to allow for this the processor compares each of the identified ripples within a set of ripples to the expected ripple shape and selects the at least two ripples $\alpha,\beta$ which most closely resemble the expected shape. As there are three channel portions in each measurement channel the processor can discard the ripple from one lock-in amplifier and still have two ripples with which to perform the method.

The invention claimed is:

1. A cytometer comprising
a plurality of measurement sections, each measurement section comprising
    first and second sidewalls and a base extending therebetween, the first and second sidewalls and base defining a channel portion therebetween, the sidewalls and base extending from an entrance to an exit;
    an electrode group arranged on the opposite side of the base to the channel portion and part way between the entrance and exit, the electrode group comprising an upstream electrode, a downstream electrode and a center electrode, the electrodes being arranged such that as one travels from the entrance to the exit one passes over the upstream electrode, then the center electrode and then the downstream electrode;
    the channel portion having a width measured in a direction normal to the sidewalls;
  the measurement sections being connected together to form at least one measurement channel comprising a plurality of the channel portions connected together in series, with each channel portion of the measurement channel having a different width; and,
  at least one lock-in amplifier;
  the electrode groups being configured such that for each group the central electrode is connected to the excitation signal port of a lock-in amplifier and the upstream and downstream electrodes are connected to the voltage differential input ports of the lock-in amplifier.

2. A cytometer as claimed in claim 1 wherein the at least one measurement channel comprises first and second channel portions only.

3. A cytometer as claimed in claim 1, wherein the at least one measurement channel comprises at least three channel portions.

4. A cytometer as claimed in claim 1, wherein the measurement sections are connected together to form a plurality of measurement channels, each measurement channel comprising a plurality of channel portions.

5. A cytometer as claimed in claim 4, wherein for at least two measurement channels the electrode groups of one measurement channel are connected to the corresponding electrode groups of the other measurement channel.

6. A cytometer as claimed in claim 1, further comprising a signal processor configured to receive the output from the at least one lock-in amplifier and perform the steps of
    (a) identify a set of ripples in the output which are produced by passage of a cell along different channel portions of a single measurement channel;
    (b) for at least two ripples $\alpha$, $\beta$ of the set of ripples which correspond to passage of the cell along channel portions $c\alpha$ and $c\beta$ determine the peak-to-peak amplitudes $V_{pp}{}^{\alpha}$ and $V_{pp}{}^{\beta}$ of the ripples; and,
    (c) solve the simultaneous equations $$V_{pp}{}^{\alpha}=k(D_{deform}{}^{2}(D_{cell},W_{c\alpha})+b)$$

$$V_{pp}{}^{\beta}=k(D_{deform}{}^{2}(D_{cell},W_{c\beta})+b)$$

to determine a cell surface charge k and the undeformed diameter of the cell where b is a constant, $W_{c\alpha}$ and $W_{c\beta}$ are the widths of the channel portions $\alpha$ and $\beta$ and $D_{deform}(D_{cell},W)$ is the diameter of a deformed cell of undeformed diameter in a channel of width and is related to $D_{cell}$ and W by the relation $$\frac{4}{3}\pi\left(\frac{D_{cell}}{2}\right)^{3}=2\pi\left(\frac{D_{deform}}{2}\right)^{2}\left(\frac{W}{2}\right)-\frac{2\pi}{3}\left(\frac{W}{2}\right)^{3}$$

7. A cytometer as claimed in claim 6, wherein the signal processor is further configured to perform the steps of
    (d) selecting a ripple r from the set of ripples and for the ripple r divide a predetermined constant C by the peak-to-peak time $t_{pp}$ of the ripple r to determine the speed of the cell which caused the ripple;
    (e) determining driving force $F_{d}$ on the cell in channel portion from a model for channel portion $C_{r}$ of the driving force as a function of cell speed and $D_{cell}$; and
    (f) determine cell stiffness E from $D_{cell}$, $W_{cr}$ and $F_{d}$.

8. A cytometer as claimed in claim 7, wherein the cell stiffness E is determined from the equation $$E=\left[\frac{6}{D_{a}}+\right.$$

$$\left.\frac{3\theta D_{a}}{D_{deform}^{2}}-\frac{8}{\pi}\frac{(3+v-2v^{2})D_{Cell}^{2}+2(1-v^{2})D_{a}^{2}}{(1-v^{2})(D_{a}^{2}+4D_{Cell}^{2})^{3/2}}\left(1+\frac{\theta D_{a}^{2}}{5D_{deform}^{2}}\right)\right]\frac{\psi(1-v^{2})F_{n}}{2(D_{Cell}-W_{cr})}$$

where $$D_{a}=\sqrt{D_{cell}^{2}-W^{2}}+D_{deform}-D_{Cell}$$

$$\psi=\frac{(1-\zeta)^{2}}{(1-\zeta+\zeta^{2}/3)}$$

$$\theta=\frac{1-\zeta/3}{1-\zeta+\zeta^{2}/3}$$

$$\zeta=1-\frac{W_{cr}}{D_{Cell}}$$

and $$F_{n}=\frac{F_{d}}{2\mu}$$

where $\mu$ is the coefficient of friction of the sidewall and $v$ is the Poisson ratio which is set equal to 0.5.

9. A cytometer as claimed in claim 6, wherein the signal processor is further configured to compare each of the set of identified ripples to an expected ripple shape and to select the at least two ripples $\alpha$, $\beta$ which most closely resemble the expected ripple shape.

10. A cytometer as claimed in claim 1, wherein each channel portion is straight and of uniform width.

11. A cytometer as claimed in claim 1, further comprising a fluid source configured to provide a pressurised fluid to the channel portion of the first measurement section of each measurement channel.

12. A method of cytometry comprising the steps of
    (a) providing a cytometer, the cytometer comprising a
      plurality of measurement sections, each measurement section comprising first and second sidewalls and a base extending therebetween, the first and second sidewalls and base defining a channel portion therebetween, the sidewalls and base extending from an entrance to an exit;
      an electrode group arranged on the opposite side of the base to the channel portion and part way between the entrance and exit, the electrode group comprising an upstream electrode, a downstream electrode and a center electrode, the electrodes being arranged such that as one travels from the entrance to the exit one passes over the upstream electrode, then the center electrode and then the downstream electrode;

the channel portion having a width measured in a direction normal to the sidewalls;

the measurement sections being connected together to form at least one measurement channel comprising a plurality of the channel portions connected together in series, with each channel portion of the measurement channel having a different width; and, at least one lock-in amplifier;

the electrode groups being configured such that for each group the central electrode is connected to the excitation signal port of a lock-in amplifier and the upstream and downstream electrodes are connected to the voltage differential input ports of the lock-in amplifier;

(b) identifying the set of ripples in the output which are produced by passage of a cell along different channel portions of a single measurement channel;

(c) for at least two ripples $\alpha$, $\beta$ of the set of ripples which correspond to passage of the cell along channel portions ca and cp determining the peak-to-peak amplitudes $V_{pp}^{\alpha}$ and $V_{pp}^{\beta}$ of the ripples; and, (d) solving the simultaneous equations $$V_{pp}^{\alpha}=k(D_{deform}^2(D_{cell},W_{c\alpha})+b)$$

$$V_{pp}^{\beta}=k(D_{deform}^2(D_{cell},W_{c\beta})+b)$$

to determine a cell surface charge k and the undeformed diameter of the cell where b is a constant, $W_{c\alpha}$ and $W_{c\beta}$ are the widths of the channel portions c$\alpha$ and c$\beta$ and $D_{deform}(D_{cell},W)$ is the diameter of a deformed cell of undeformed diameter in a channel of width and is related to $D_{cell}$ and W by the relation $$\frac{4}{3}\pi\left(\frac{D_{cell}}{2}\right)^3 = 2\pi\left(\frac{D_{deform}}{2}\right)^2\left(\frac{W}{2}\right)-\frac{2\pi}{3}\left(\frac{W}{2}\right)^3$$

13. A method as claimed in claim 12, further comprising the steps of (e) selecting a ripple r from the set of ripples and for ripple r divide a predetermined constant C by the peak-to-peak time $t_{pp}$ of the ripple r to determine the speed of the cell which caused the ripple;

(f) determining driving force $F_d$ on the cell in the channel portion from a model for channel portion cr of the driving force as a function of cell speed and $D_{cell}$; and (g) determining cell stiffness E from $D_{cell}$, $W_{cr}$ and $F_d$.

14. A method as claimed in claim 13, wherein the cell stiffness E is determined from the equation $$E = \left[\frac{6}{D_a} + \frac{3\theta D_a}{D_{deform}^2} - \frac{8}{\pi}\frac{(3+v-2v^2)D_{Cell}^2+2(1-v^2)D_a^2}{(1-v^2)(D_a^2+4D_{cell}^2)^{3/2}}\left(1+\frac{\theta D_a^2}{5D_{deform}^2}\right)\right]\frac{\psi(1-v^2)F_n}{2(D_{Cell}-W_{cr})}$$

where $$D_a = \sqrt{D_{cell}^2-W^2}+D_{deform}-D_{Cell}$$

$$\psi = \frac{(1-\zeta)^2}{(1-\zeta+\zeta^2/3)}$$

$$\theta = \frac{1-\zeta/3}{1-\zeta+\zeta^2/3}$$

$$\zeta = 1-\frac{W_{cr}}{D_{Cell}}$$

and $$F_n = \frac{F_d}{2\mu}$$

where $\mu$ is the coefficient of friction of the sidewall and $v$ is the Poisson ratio which is set equal to 0.5.

\* \* \* \* \*